(12) United States Patent
von Spiegel

(10) Patent No.: US 11,531,198 B2
(45) Date of Patent: Dec. 20, 2022

(54) HEAD-UP DISPLAY

(71) Applicant: Continental Automotive GmbH, Hannover (DE)

(72) Inventor: Wolff von Spiegel, Bad Homburg (DE)

(73) Assignee: Continental Automotive GmbH, Hannover (DE)

( * ) Notice: Subject to any disclaimer, the term of this patent is extended or adjusted under 35 U.S.C. 154(b) by 151 days.

(21) Appl. No.: 16/797,363

(22) Filed: Feb. 21, 2020

(65) Prior Publication Data

US 2020/0264431 A1    Aug. 20, 2020

Related U.S. Application Data

(63) Continuation of application No. PCT/EP2018/072331, filed on Aug. 17, 2018.

(30) Foreign Application Priority Data

Aug. 22, 2017  (DE) .................... 10 2017 214 592.7

(51) Int. Cl.
*G02B 3/00* (2006.01)
*G02B 27/01* (2006.01)

(52) U.S. Cl.
CPC ....... *G02B 27/0101* (2013.01); *G02B 3/0043* (2013.01); *G02B 3/0056* (2013.01); *G02B 2027/012* (2013.01); *G02B 2027/0145* (2013.01)

(58) Field of Classification Search
CPC .. G02B 3/0043; G02B 3/0056; G02B 5/0215; G02B 5/0278; G02B 27/0101; G02B 2027/012; G02B 2027/0145
See application file for complete search history.

(56) References Cited

U.S. PATENT DOCUMENTS

| | | |
|---|---|---|
| 2001/0012078 A1 | 8/2001 | Hira et al. |
| 2007/0002453 A1 | 1/2007 | Munro |
| 2007/0242475 A1 | 10/2007 | Minobe et al. |
| 2015/0253469 A1 | 9/2015 | Le Gros et al. |
| 2016/0320615 A1 | 11/2016 | Nakamura et al. |
| 2016/0335959 A1 | 11/2016 | Kuraishi et al. |
| 2019/0018170 A1 | 1/2019 | Watanabe et al. |

FOREIGN PATENT DOCUMENTS

| | | |
|---|---|---|
| CN | 1969203 A | 5/2007 |
| CN | 203444171 U | 2/2014 |
| DE | 19755565 A1 | 6/1998 |
| DE | 102009002189 A1 | 10/2010 |
| DE | 102012210808 A1 | 1/2014 |

(Continued)

OTHER PUBLICATIONS

Notice on the Result of the International Reference Number Part Search dated Dec. 12, 2018 for corresponding PCT Application No. PCT/EP2018/072331.

(Continued)

*Primary Examiner* — Ryan D Howard

(57) ABSTRACT

A head-up display has a display element, a projection system, a diffusing plate, and a mirror element. In such head-up displays, frequently irritations due to stray light occur. A head-up display that produces less irritation from incident stray light is therefore desirable. The diffusing plate has focusing elements on its side facing the projection system and a light-blocking mask on its side facing away from the projection system.

14 Claims, 7 Drawing Sheets

(56) References Cited

FOREIGN PATENT DOCUMENTS

| | | |
|---|---|---|
| DE | 102013221741 A1 | 4/2015 |
| DE | 102015116297 A1 | 3/2017 |
| EP | 1729172 A1 | 12/2006 |
| JP | 10039769 A | 2/1998 |
| JP | H10123623 A | 5/1998 |
| JP | 11344602 A | 12/1999 |
| JP | 2012208440 A | 10/2012 |
| JP | 2016122059 A | 7/2016 |
| JP | 2016206563 A | 12/2016 |
| KR | 1020010076359 A | 8/2001 |
| WO | 2014119407 A1 | 8/2014 |
| WO | 2016124713 A2 | 8/2016 |
| WO | 2017122651 A1 | 7/2017 |

OTHER PUBLICATIONS

The International Search Report and Written Opinion of the International Searching Authority for the corresponding PCT Application No. PCT/EP2018/072331.
German Office Action dated May 28, 2018 for the corresponding German Patent Application No. 10 2017 214 592.7.
Notification of Reason for Refusal (translated and original) dated Feb. 18, 2022 from corresponding Korean patent application No. 10-2020-7004612.
Notice of Allowance dated Aug. 30, 2022 from corresponding Korean patent application No. 10-2020-7004612.
Office Action dated Sep. 28, 2022 from corresponding Chinese patent application No. 201880053990.1.

HEAD-UP DISPLAY

TECHNICAL FIELD

The present invention relates to a head-up display having a projection system.

BACKGROUND

US 2016/0335959 A1 illustrates a head-up display with a display element, a projection system, a diffusing plate and a mirror element. A stray light that is incident on the diffusing plate from outside in the direction of the projection system is reflected by the surface of the diffusing plate in directions in which it can reach the eye of the viewer via the optical system and thus causes irritations in the viewer.

A head-up display that produces less irritation from incident stray light is desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A head-up display has an intermediate image production unit which consists of a display element, a projection system, a diffusing plate and a mirror element. The diffusing plate has focusing elements on a side facing the projection system and has a light-blocking mask on a side facing away from the projection system. Therefore, the mask blocks stray light, which consequently does not continue to travel in the direction of the projection system or the intermediate image plane and cannot produce stray reflections or the like there. The focusing elements focus the light coming from the projection system onto openings in the mask, with the result that nearly the entire light emitted by the projection system actually reaches the mirror element and thus travels in the direction of the viewer. Owing to the focusing elements, it is directed into an angle range that is useful for the viewer. Likewise, stray reflections produced in the diffusing element on account of total internal reflection, also known as TIR, are effectively reduced by the arrangement.

The display element can here be a self-luminous display element, for example an OLED display based on organic light-emitting diodes, a backlit display element, for example an LCD display based on liquid crystals, or a reflective display element, for example a DMD display based on digital micromirror devices. The projection system is used to project and enlarge the image of the display element. Under certain circumstances, projection that reduces the image size can also be appropriate. The diffusing plate is arranged in an intermediate image plane of the projection system. The image on the diffusing plate is transformed by a virtualization system into a virtual image and is superposed on the environment using the mirror element. The mirror element used here is in many cases the windshield of the vehicle or what is known as a combiner arranged between said windshield and the viewer. Rather than the diffusing plate, another diffusing element that is not in the form of a plate may also be appropriately used. The virtualization system used is for example a combination of a folding mirror and a concave mirror.

The light-blocking mask may consist of a light-absorbing material. Therefore, the stray light that is incident in the direction of the projection system is absorbed by the mask. Stray light that passes through openings in the mask and is reflected by the focusing elements mainly travels to the rear-side part of the mask, where it is absorbed. Only a negligibly small portion travels back through the openings in the mask for a second time or is not reflected onto the mask by the focusing elements and then falls into the eye of the viewer in the form of stray light. In this way, stray light, for example sunlight that is incident in the head-up display, is effectively reduced.

The light-blocking mask may consist of a reflective material, and for the diffusing plate to be arranged such that it is tilted relative to the optical axis of the virtualization system. Therefore, the incident sunlight is reflected but does not reach the mirror element owing to the tilted arrangement of the diffusing plate and consequently has no disturbing effect on the viewer. If the optical axis of the virtualization system cannot be easily determined, provision is made for the diffusing plate in the beam path to be tilted such that light that is incident via the virtualization system from outside is not reflected back to the outside by the diffusing plate, or only a small portion of that light is reflected back to the outside, and consequently has no disturbing effect on the viewer. The light-blocking mask can also be designed to be reflective on one side and absorptive on the other.

Provision is made for the focusing elements to be formed by a microlens field, also known as a microlens array. Such a microlens array can be produced cost-effectively.

The microlenses of the microlens array may be arranged such that they are tilted. The microlenses are here tilted, depending on the distance from the optical axis, such that exiting light beams traveling through the opening in the mask exhibit best possible adaptation to the virtualization system. Therefore, all regions of the diffusing plate are perceived equally in the virtual image by the viewer. Such a tilt may be achieved by arranging the individual microlenses with different offsets with respect to the openings in the mask. The light incidence that occurs as a result more or less far outside the respective optical axis of the individual microlenses has an effect that corresponds to a tilt. A mere offset as opposed to a tilt simplifies the production of the microlens array.

The diffusing plate has a further surface structure above the light-blocking mask. This makes possible further light shaping without the need to arrange an additional component in the beam path. This saves installation space. The surface structure is here for example formed by a multiplicity of lens surfaces that are arranged next to one another, wherein the number can even be relatively small, and, in the extreme case, a single lens surface is provided as the surface structure. Alternatively, the mask itself can have a surface structure. This for example is embodied in the form of a Fresnel lens, as a diffuser, or as a structure making possible another desired effect. If such a surface structure is arranged below the mask, this has the advantage that, on account of the function of the mask, hardly any back-reflections occur in the case of stray light that is incident from above.

The further surface structure may be a surface structure that realizes a field lens function. Therefore, a field lens, which is required in the head-up display in any case, is integrated in the diffusing plate. The surface structure to this end is designed for example as a Fresnel lens structure. If a microlens arrangement is provided as the surface structure, it realizes the field lens function in combination with the microlens array. A suitable field lens effect is achieved by appropriately selecting the distances between the lenses of the two microlens arrangements.

The openings in the mask may make up less than 5% of the surface area of the mask. Therefore, more than 95% of stray light are already eliminated upon first impingement thereof on the mask. The small surface area of the opening has the result that the light that is focused by the focusing elements leaves the openings in the mask at an opening angle of approximately 30°, which is greatly suitable for a head-up display.

One variant of the head-up display has, rather than a display element and a projection system, a different intermediate image production unit, for example a phase modulator or a laser scanning system. Disturbing reflections can be meaningfully reduced with the diffusing plate even in the case of such an intermediate image production unit.

The focusing elements may be irregularly arranged on the surface of the diffusing plate such that, suppressing Moiré patterns occurs. Moiré patterns are suppressed more effectively if the focusing elements themselves have irregular shapes.

Alternatively or additionally, provision is made for the focusing elements to have a common structure size. That is to say, no structures that are significantly greater or significantly smaller than the average occur. This prevents large-area, perceivable variations in the lighting.

The focusing elements have a round shape and/or an elongate shape and/or an irregular shape. For example, a mixture of said shapes may result in a suppression of Moiré patterns.

An optical unit for a head-up display has a display element, a projection system, and a diffusing plate, as described above. The optical unit is suitable here to form, combined with a mirror element, a head-up display. Frequently, the optical unit is the economical unit that only forms a head-up display with the mirror element located in a vehicle, for example the windshield, upon being installed in said vehicle.

In a method for producing a head-up display, focusing elements are initially produced on a first side of a carrier of a diffusing plate. This is done for example using a correspondingly designed injection mold, with which the diffusing element is produced. On the second side thereof that is located opposite the first side, a coating is applied. Said coating can be light-blocking and in this case be absorptive on both sides or be absorptive toward the diffusing plate and reflective on the side thereof that faces away from the diffusing plate. Rather than a light-blocking coating, a different coating can also be provided here, for example a photoresist. Subsequently, the first side is exposed to a beam having defined properties, with an intensity and duration, etc. that are suitable for producing openings in the coating. If appropriate, a combination with etching medium or other suitable measures can be realized here. Subsequently, the diffusing plate is combined with a projection system that is able to produce a beam having the stated defined properties and with a display element.

Therefore, the diffusing plate together with a mask is optimally adapted to the projection system. Alternatively, the diffusing plate and the projection system are initially combined and the exposure is then performed through the projection system that is combined with the diffusing plate. In this way, too, it is ensured that the diffusing plate and the projection system are optimally adapted to one another. A process consisting of placement, exposure, etching and adhesive bonding can also be used here. It is likewise possible here to meaningfully use methods based on pulse scanning or other suitable methods.

According to one aspect, a photoresist is applied on the rear side of the lens array in a method also referred to as a "lift-off method". Said photoresist is exposed through the lens array and remains intact at the exposed locations, that is to say at the locations at which the openings are to be situated later. Subsequently, an opaque coating is applied. The photoresist that have remained intact is then dissolved, as a result of which the coating situated thereabove is also removed. This produces the openings in the mask.

In a production method, provision is made for an adhesive to be applied, before the combining, onto the second side of the diffusing plate onto which a microlens arrangement is applied that is subsequently aligned with respect to the focusing elements, and for the adhesive to be subsequently cured. This represents an efficient possibility for producing the diffusing plate with a microlens arrangement. A purely adhesive bond, braces or a non-curing adhesive can also be meaningfully used here.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

These and further variants and advantages of the invention are indicated in the following description of exemplary embodiments and can be gathered therefrom and from the figures. In the figures.

DETAILED DESCRIPTION

Figure 1:
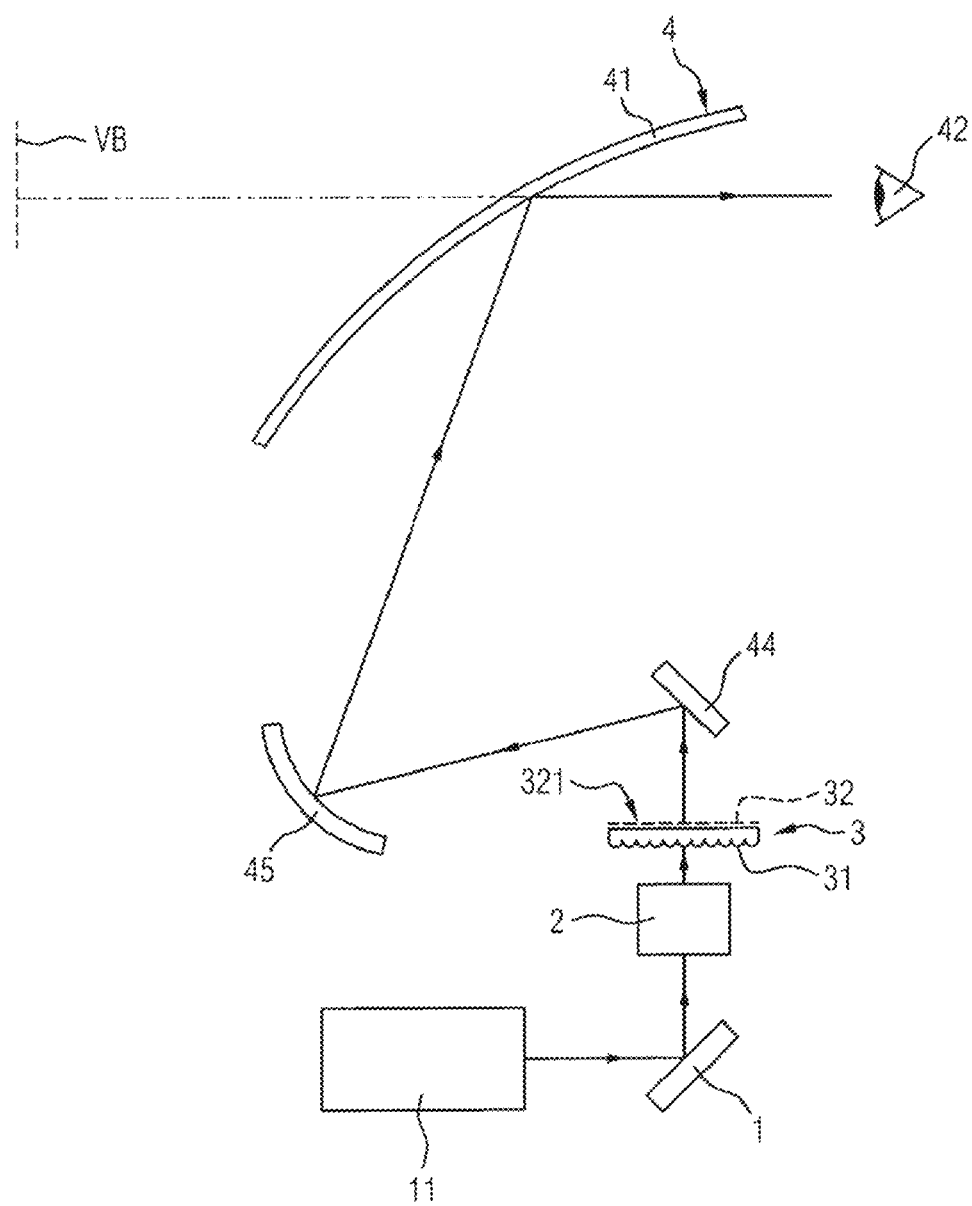
FIG. 1 shows a schematic illustration of a head-up display.

FIG. 1 shows a head-up display having a display element 1, a projection system 2, a diffusing plate 3, and a mirror element 4. The mirror element 4 is formed here as a windshield 41 of a motor vehicle. The display element 1 is illuminated by a light source 11. The light coming from the light source 11 is reflected at the display element 1 in the direction of the projection system 2. The latter projects and increases or, if it has a corresponding design, decreases the size of the image of the display element onto the diffusing plate 3. From there, it is reflected by a folding mirror 44 onto a concave mirror 45, which in turn increases its size and transforms it into a virtual image. The light coming from the concave mirror 45 is reflected at the mirror element 4, the windshield 41, into the eye 42 of the viewer. In the process, it is superposed on the image of the environment that is visible through the windshield 41 and appears as a virtual image VB in the travel direction in front of the windshield above the hood of the vehicle or even in front of the vehicle.

It can be seen that the diffusing plate 3 has focusing elements 31 on its side that is located at the bottom in the figure. These face the projection system 2. A light-blocking mask 32 is located on the side of the diffusing plate 3 that faces away from the projection system 2. The light-blocking mask 32 has openings 321, through which light, which is coming from the projection system 2 and is focused by the focusing elements 31, passes and travels in the direction of the folding mirror 44.

Corresponding reference signs as described above will be used in the following figures for elements which are identical or have the same effect. Individual elements will not necessarily be described again, unless this appears useful for better comprehension.

Figure 2:
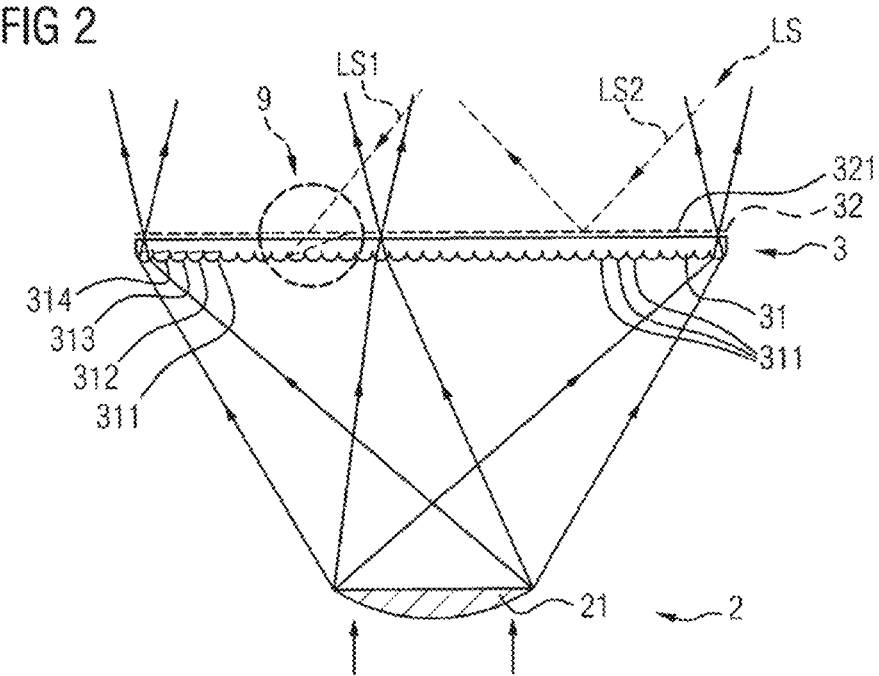
FIG. 2 shows a diffusing plate.

FIG. 2 shows a diffusing plate 3 in an enlarged illustration. It shows light coming from a lens 21 of the projection system 2 that is focused by the focusing elements 31 onto openings 321 in the light-blocking mask 32. The corresponding light beams are illustrated using solid lines, and the propagation direction is indicated by arrows. The figure further indicates, in dashed lines, stray light LS, which is coming from the top right and is incident on the diffusing plate 3. This is for example sunlight, which, in unfavorable conditions, falls into the head-up display and typically passes onto the diffusing plate 3 by way of a virtualization system, which is formed here by the folding mirror 44 and the concave mirror 45. The left-hand part of the figure shows stray light LS1 which falls through one of the openings 321 in the light-blocking mask 32, is reflected at the interface of one of the focusing elements 31, and is incident on the light-blocking mask 32 from below. See also in this respect FIG. 9, which illustrates an enlargement of the dashed region 9. The mask 32 is absorptive on its side that faces the focusing elements 31, with the result that the stray light LS1 that impinges on it from below is absorbed there. The right side shows stray light LS2 which is reflected at the upper side of the light-blocking mask 32.

According to a variant, the light-blocking mask 32 is also designed to be absorptive on its upper side, with the result that the stray light LS2 is also absorbed by the light-blocking mask 32 and cannot cause irritation. The focusing elements 31 are microlenses 311, which are arranged in the form of a microlens array. In the left part of the figure, the individual microlenses 312, 313, 314 are arranged such that they are tilted relative to the remaining microlenses 311. That is to say that their axes of symmetry are not perpendicular to the plane of the diffusing plate 3 but inclined differently depending on their distance from the center. This serves to also distribute the light that is incident toward the periphery of the diffusing plate 3 as optimally as possible. The tilted microlenses 312-314 are shown here merely by way of example, and the tilt angle is not necessarily illustrated to scale either but has the purpose here of illustrating the principle. The openings 321 can for example also be formed as transparent regions of a mask 32, which is realized as a photographic film.

After passing through the focusing elements 31 and any other further constituent parts of the diffusing plate 3, the used light, which is coming from the projection system 2, travels through the openings 321 in the light-blocking mask 32, which acts as an aperture mask. If the radiation direction is intended to be controlled further, the microlenses 311-314 will be embodied with an appropriate tilt and the locations of the openings will be adapted. If the sun-facing side, in the present case the upper side, is embodied to be absorptive, the stray light LS, LS1, LS2 is blocked upon impingement on the light-blocking mask 32. If the sun-facing side of the mask 32 is embodied to be reflective, the stray light is reflected, as is shown for the stray light LS2. This is typically combined with tilting of the diffusing plate 3, see FIG. 4. In this way, the stray light LS2 is guided out of the beam path into a light trap.

Better stray light suppression can generally be expected if the sun-facing side is reflective, in the figure the upper side, than in the case of a sun-facing side that is embodied to be absorptive, since good absorbers are not the norm. However, in that case a tilt or a measure having a similar effect that prevents a back-reflection into the eye 42 of the driver is necessary. On the projector-facing side, the lower side in the figure, an absorptive layer—as illustrated—is provided. Without it, there is a risk that light travels within the diffusing plate 3 in an uncontrolled fashion and can thus bring about a contrast reduction.

Figure 3:
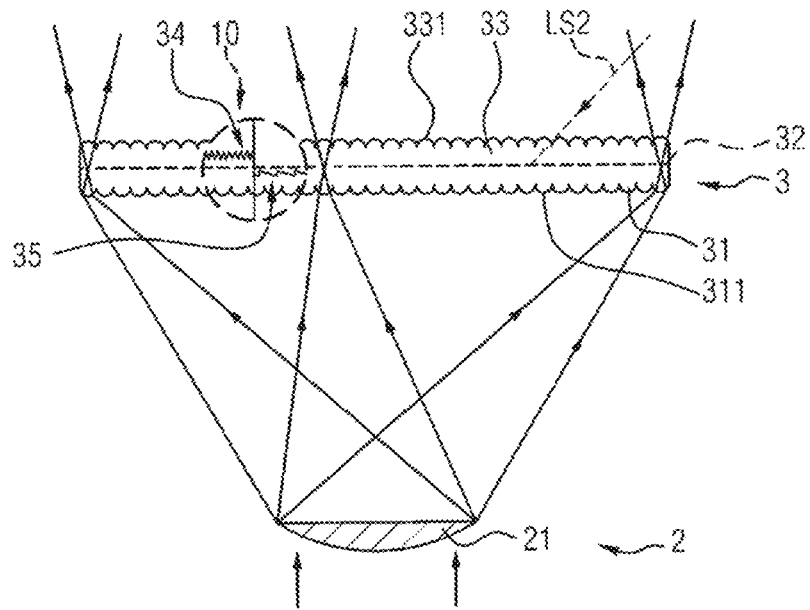
FIG. 3 shows a variant of a diffusing plate.

FIG. 3 shows a further variant of a diffusing plate 3. In this case, a further surface structure 33 is arranged in the figure above the light-blocking mask 32. The further surface structure 33 likewise consists of many microlenses 331, which are arranged one next to the other and are configured such that they realize, in combination with the lower focusing elements 31, a field lens function. The microlenses 331 above the mask 32 and the microlenses 311 below the mask 32 in the central region of the diffusing plate 3 are here not offset with respect to one another, with the result that light is almost not deflected in the central region.

The further away from the central region the microlenses 331, 311 are situated, the more they are offset with respect to one another, with the result that light in the exterior region is tilted more strongly toward the optical axis, the further from the optical axis it passes through the diffusing plate 3. In this way, a field lens effect is achieved by way of the different grid spacings of the microlenses 331 and the microlenses 311. The light traveling from the diffusing plate 3 toward the mirror element 4 has an opening angle and an orientation that are defined by the design of the surface structure 33. Shown here is a stray light beam LS2, which is incident on the light-blocking mask 32 through the microlenses 331 and is absorbed there.

The mask 32 that is illustrated in FIG. 3 is designed to be absorptive on both sides. The second surface structure 33 serves for further shaping of the used light. Therefore, the possibility of the integration of a field lens function with uniform lens arrays is present. An embodiment having a reflective, sun-facing side is an option that can be used under suitable boundary conditions. As an alternative variant, a surface structure 34 of the diffusing plate 3 arranged above the mask 32 is shown schematically and by way of example on the left-hand side in the region 10. This surface structure is provided instead of the surface structure 33 that is applied as a separate layer. A surface structure 35 of the diffusing plate 3 arranged below the mask 32 is shown schematically and by way of example on the right-hand side in the region 10. Said surface structure 35 has a microstructure that produces Fresnel effects. Shown by way of example is an inclined area under the openings in the mask 32. Therefore, the surface structure 35 below the mask 32, owing to the function of the mask 32, hardly any back-reflections occurs in the case of stray light that is incident from above.

Figure 4:
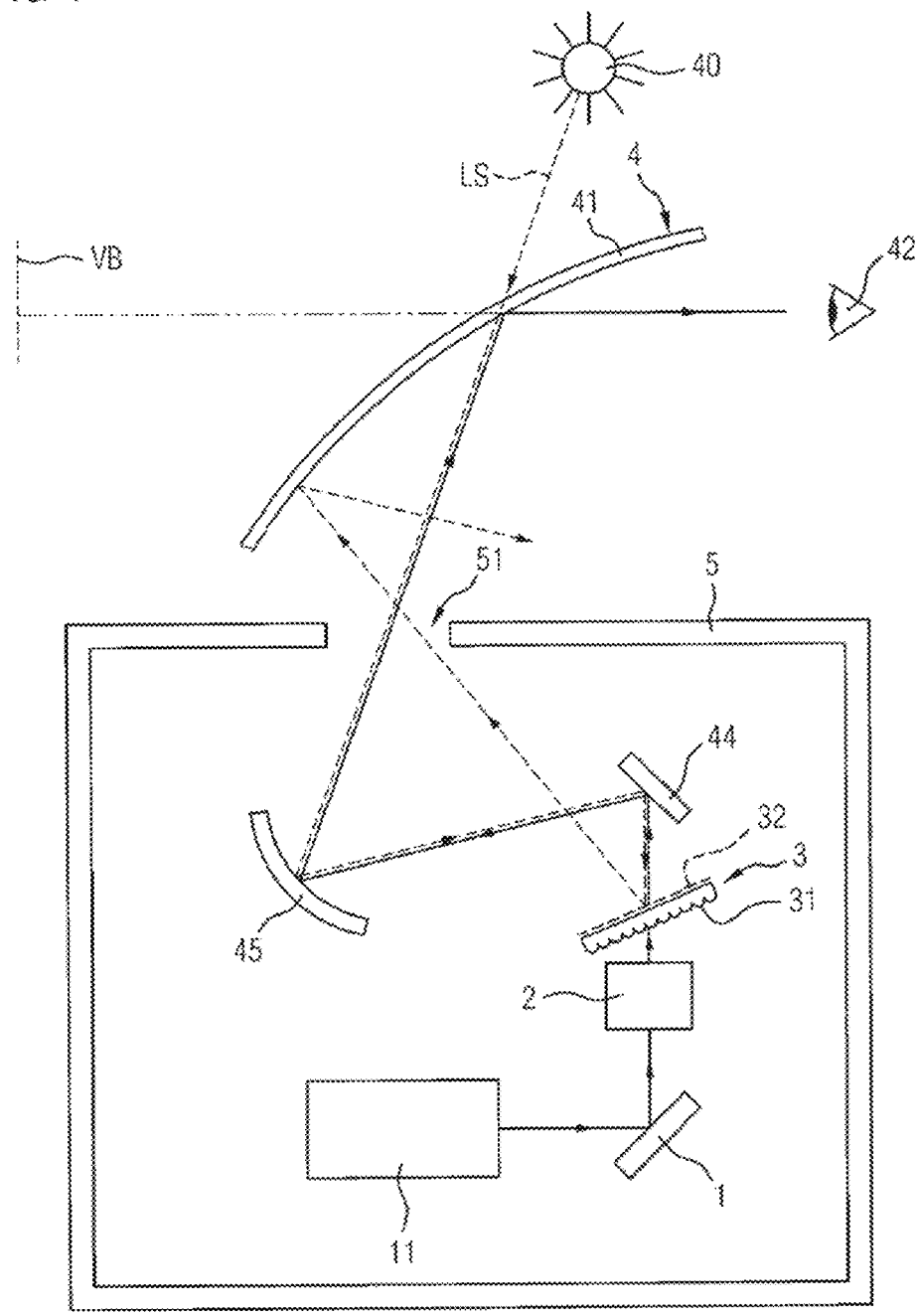
FIG. 4 shows a variant of a head-up display.

FIG. 4 shows a variant of a head-up display. The optical elements are arranged substantially as described for FIG. 1.

A difference is that the diffusing plate 3 is arranged such that it is tilted relative to the optical axis of the light that is coming from the virtualization system, in the present case the folding mirror 44 and the concave mirror 45. The tilt angle is here not necessarily illustrated to scale but rather shown in an exaggerated fashion so as to illustrate the principle. It can be seen that, after passing through the windshield 41, stray light LS coming from the sun 40 (illustrated in dashed form) travels at the same angle as the light that is coming from the concave mirror 45 (illustrated with a solid line), but in the opposite direction. The stray light LS then passes into the head-up display. It is reflected by the concave mirror 45 and the folding mirror 44 and is incident on the light-blocking mask 32 of the diffusing plate 3. The light-blocking mask 32 illustrated here has a reflective surface on its side facing away from the focusing elements 31, with the result that the stray light LS is reflected. Owing to the tilt of the diffusing plate 3, the stray light LS is guided in the illustration to the outside through an opening 51 in a housing 5 of the head-up display, where it in any case does not pass into the eye 42 of the viewer again and thus does not trigger an irritation in said viewer.

Figure 5:
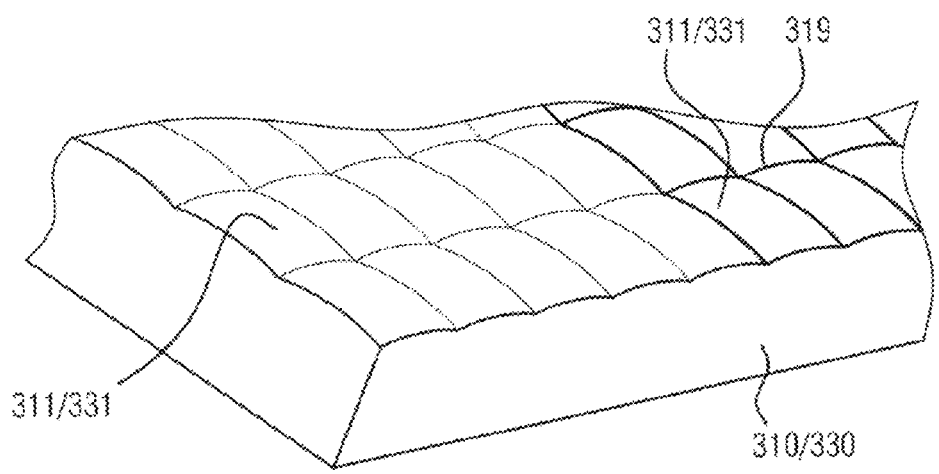
FIG. 5 shows a microlens array by way of example.

FIG. 5 shows a detail of an exemplary microlens array 310 made of microlenses 311 and of a microlens arrangement 330 made of microlenses 331. The microlens array 310 and the microlens arrangement 330 can in principle be of a similar construction, while the sizes of the microlenses 311, 331, the curvature thereof and other optical properties differ in accordance with their function. The microlenses 311, 331 here cover in each case a rectangular surface area and seamlessly transition into one another. In an alternative part of the microlens array 310 illustrated or of the microlens arrangement 330, non-transparent regions 319 are located between the microlenses 311, 331. Said non-transparent regions 319 serve for blocking light that is refracted in undefined fashion in the boundary region of the individual microlenses 311, 331 with respect to one another possibly due to production inaccuracies of the surface and thus for preventing possible irritations in the viewer.

Figure 6:
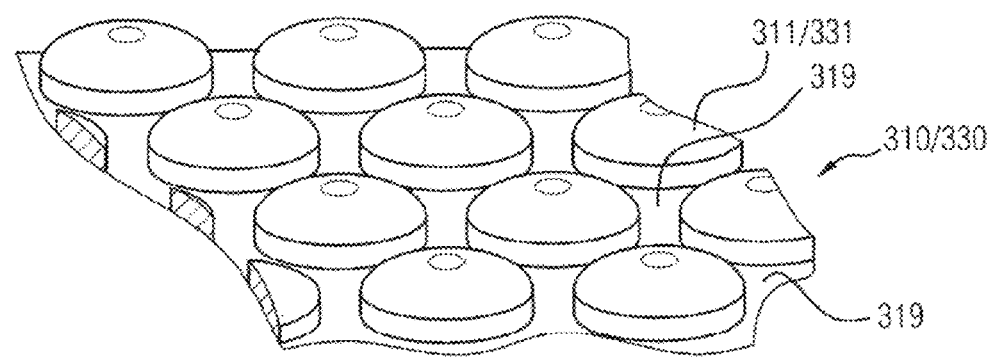
FIG. 6 shows a microlens array by way of example.

FIG. 6 shows another microlens array 310 or another microlens arrangement 330. Here, the microlenses 311, 331 are arranged according to the hexagonally densest packing. Regions 319 are located between the microlenses 311, 331. Said regions are embodied to be non-transparent. Light impinging there would only still be correctly refracted onto one of the openings 51 assigned to the neighboring microlenses 311 by a surface geometry to be produced with undue effort, or light coming from the openings 51 would only still be refracted correctly by one of the corresponding microlenses 331 by a surface geometry to be produced with undue effort. The regions 319 are therefore embodied to be non-transparent and shadow the light impinging thereon.

Figure 9:
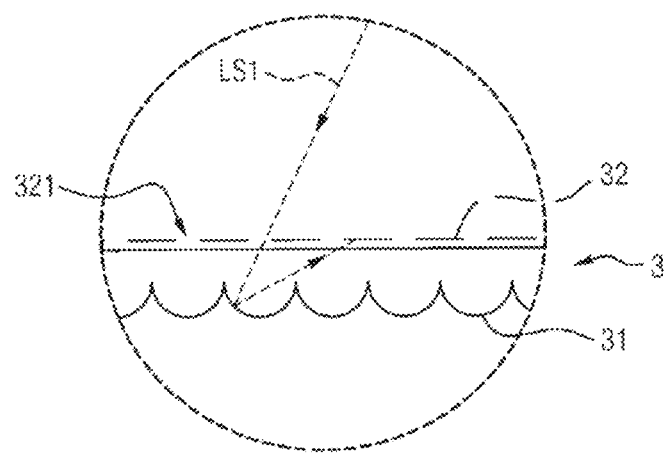
FIG. 9 shows an enlargement of a detail from FIG. 2.

FIG. 9 shows an enlargement of a detail of the region 9 of FIG. 2. The figure shows the stray light LS1 incident from outside which falls through an opening 321 in the light-blocking mask 32, is reflected at an interface of one of the focusing elements 31, and is subsequently incident on the light-blocking mask 32 from below. A disturbing reflection is thus avoided. This is achieved also if the light-blocking mask 32 is designed to be reflective on its upper side and absorptive on its lower side.

Figure 10:
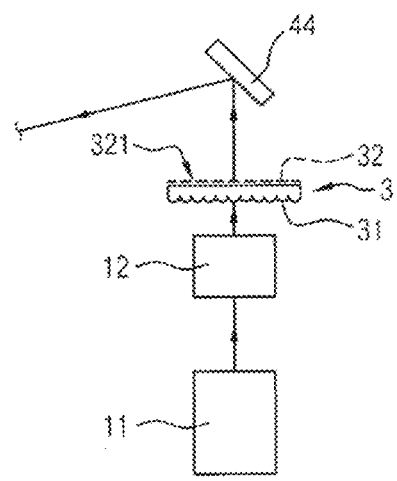
FIG. 10 shows a variant of a head-up display.

FIG. 10 shows part of a head-up display according to the lower right-hand part of FIG. 1, in which, rather than the display element 1 and the projection system 2, a phase modulator 12 is arranged as the intermediate image production unit between the light source 11 and the diffusing plate 3. The beam path downstream of the folding mirror 44 corresponds to that shown in FIG. 1 and is therefore here not illustrated again. The phase modulator 12 is here shown in transmission, but is frequently also used in reflection. It generally also includes one or more lenses and possibly further optical elements, which cannot be seen here in the simplified illustration.

Figure 11:
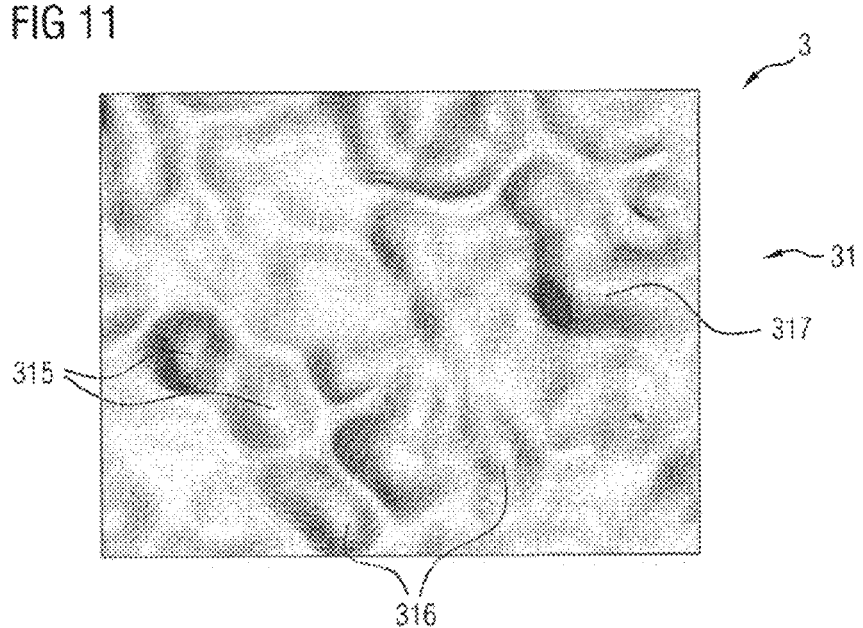
FIG. 11 shows an example of focusing elements.

FIG. 11 shows an example of focusing elements 31, 315, 316, 317, which are irregularly arranged on the surface of the diffusing plate 3. The diffusing plate 3 in this exemplary embodiment is an interference-lithographically produced diffuser. The focusing elements 31, 315, 316, 317 also have irregular shapes. What they have in common is the structure size. That is to say, no structures that are significantly greater or significantly smaller occur. There are focusing elements 315 having an almost round shape. They have similar optical properties as the microlenses described further above, for example they focus to a point or nearly to a point. There are focusing elements 316 having a more elongate shape. These have a more elongated focus, a focal line. There are also focusing elements 317 having an irregular shape. This results in a rather irregular focus geometry. The mask produced using exposure according to a method consequently has an irregular distribution of irregularly shaped openings, which are optimally adapted to the irregularly arranged and shaped diffusing plate 3 having focusing elements 31, 315, 316, 317. This variant exhibits very good suppression of Moiré patterns.

Figure 7:
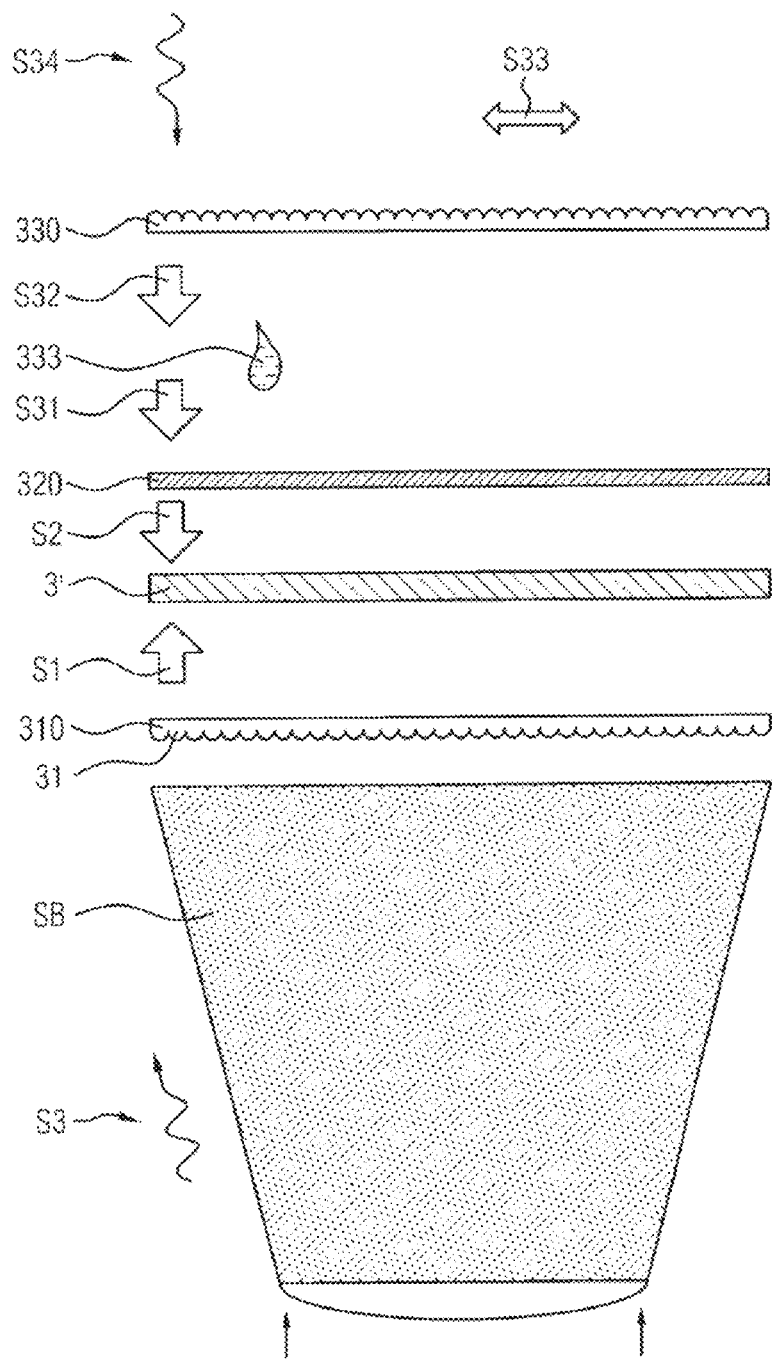
FIG. 7 shows a production method.

FIG. 7 shows a production method. In a step S1, an arrangement 310 of focusing elements 31 is applied on a carrier 3', which may already have the diffusing property of the diffusing plate 3. This is indicated by way of an arrow. In a step S2, a light-blocking coating 320 is applied on the opposite side of the carrier 3'. In a step S3, the side of the carrier 3' that is provided with the focusing elements 31 is exposed to a beam SB having defined geometric properties with a wavelength, an intensity and a duration suitable for producing openings 321 in the coating. Such openings 321 are shown in previous figures. In a step S4, the carrier 3' is combined with a projection system 2 and a display element 1. The projection system 2 is here able to produce a beam SB of the stated defined geometric properties, but which generally deviates in terms of wavelength, intensity and/or duration from the one used for producing the openings. Such a combination is shown for example in FIG. 1 and FIG. 4.

Figure 8:
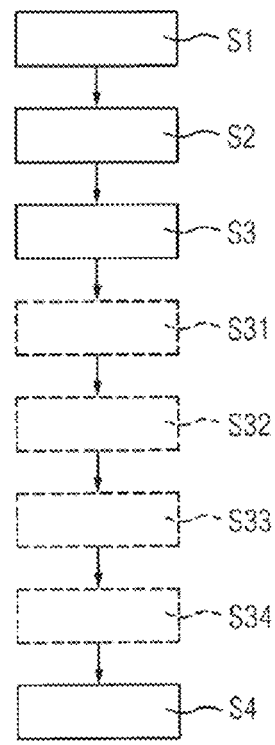
FIG. 8 shows a flowchart of a production method.

For producing an expanded diffusing plate 3, provision is made for applying an adhesive 333 on the second side of the diffusing plate 3, which is provided with the light-blocking mask 32, in a step S31. In a subsequent step S32, a microlens arrangement 330 is applied on the adhesive 333 and subsequently aligned relative to the focusing elements 31 in a step S33. After alignment is complete, the adhesive 333 is cured in a step S34. For this purpose, for example an adhesive 333 that is curable using UV radiation is used. The exposure to UV light preferably takes place from the side facing away from the focusing elements 31. FIG. 8 shows a corresponding flowchart, in which the optional steps S31 to S34 are illustrated in dashed lines.

It is appropriate in the production method to perform exposure through the lens array from the direction of the projection system 2. The openings in the mask 32 are then produced, optimally oriented, by way of laser ablation or other interactions of the light with the unstructured mask, the light-blocking coating 320. This is done for example by way of better solubility at the exposed locations.

In the case of projector-based windshield head-up displays, in which the driver sees the virtual image VB in a region in which he can see through the windshield 41 to the outside, there is one way in which sunlight LS can impinge on the diffusing plate 3, which is located in the intermediate image plane and onto which the image is projected for the further imaging stage to form a virtual image VB. Additionally, said sunlight LS is partially focused even more or less by the imaging stage. The diffusing plate 3 or another type of diffusing plate that makes the image visible over what is known as the eyebox is located in the intermediate image plane. Due to this function, the diffusing plate 3 is frequently also referred to as an exit pupil expander. The diffusing plate 3 also reflects back some of the sunlight LS, as a result of which the image contrast can be reduced, or as a result of which said light can become visible for the driver in the form of undesirable and/or disturbing reflections or brightening. The present invention significantly reduces reflections of the diffusing plate 3 and/or deflects them in directions in which they can no longer be perceived from the eyebox.

The eyebox denotes the spatial region in which the eye 42 of the viewer must be located for it to be able to perceive the virtual image VB completely, that is to say without cropping. If the eye 42 of the viewer is situated outside the eyebox, the virtual image VB is perceivable only partially or not at all. That is to say, if the stray light LS is guided into a spatial region outside the eyebox, it at least does not have the effect of an irritation for the virtual image VB produced by the head-up display. Disturbing reflections are largely avoided by the invention even in the case of the larger, extended eyebox. The extended eyebox is understood to mean the region in which the eye of the driver can also be located but from which the display of the head-up display is not or only partially visible.

According to one embodiment, a diffusing plate 3 is constructed with focusing elements 31, for example with a microlens array 310. The entrance apertures of the microlenses 311 are here situated in the direction of the projection system 2. In the embodiment, a light-blocking mask 32 lies on the side of the sunlight incidence designed such that the light coming from the projection system 2 can pass through it, but most of the other light is blocked. The incident sunlight LS can pass through the mask 32 only through the openings 321 therein, the rest is absorbed, or, in the case of a reflective mask 32, guided into a light trap. In other words, only residual reflected light that is scattered at the openings 321 or at the mask 32 returns from the surface. The sunlight that still passes through and is reflected by the side of the structure facing the projection system 2, possibly by total internal reflection, must pass through the mask 32 again to exhibit a disturbing effect. Overall, this approach reduces the tendency for back-reflections of the diffusing plate 3 acting as an eye pupil expander.

According to one embodiment, the function of an exit pupil expander, which is assumed here by the diffusing plate 3, is supplemented by a special mask 32 that permits stray light filtering. In further variants, additionally a light trap is used or further beam shaping is performed. In addition to the embodiment, the following variants should be mentioned among others: A fully absorptive mask is used, a fully reflective mask is used, a mask which is designed to be reflective on one side and absorptive on one side is used. Further variants exhibit a combination with a second structured surface 33 for further beam shaping. The mask 32 is preferably produced by way of exposure through the structure itself, for example in connection with short-pulse lasers.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A head-up display comprising:
    a display element;
    a projection system;
    a mirror element; and
    a diffusing plate having focusing elements on a side facing the projection system a light-blocking mask on a side facing away from the projection system, wherein the light blocking mask is a reflective material, and the diffusing plate is tilted relative to the optical axis of a virtualization system.

2. The head-up display as claimed in claim 1, wherein the light-blocking mask is a light-absorbing material.

3. The head-up display as claimed in claim 1, wherein the focusing elements are formed by a microlens array.

4. The head-up display as claimed in claim 3, wherein microlenses of the microlens array are tilted.

5. The head-up display as claimed in claim 1, wherein the diffusing plate has a further surface structure below the light-blocking mask.

6. The head-up display as claimed in claim 1, wherein openings in the mask make up less than 5% of the surface area of the mask.

7. A head-up display comprising:
    a display element;
    a projection system;
    a mirror element; and
    a diffusing plate having focusing elements on a side facing the projection system a light-blocking mask on a side facing away from the projection system, wherein the diffusing plate has a further surface structure above the light-blocking mask, and wherein the surface structure is a surface structure realizing a field lens function.

8. A head-up display comprising:
    a display element;
    a projection system;
    a mirror element; and
    a diffusing plate having focusing elements on a side facing the projection system a light-blocking mask on a side facing away from the projection system, wherein, the display element and the projection system, comprise an intermediate image production unit, in which an image is first produced on the intermediate image plane, is arranged between the light source and the diffusing plate.

9. The head-up display as claimed in claim 8, wherein the intermediate image production unit is one made up of a phase modulator and a laser scanning system.

10. A head-up display comprising:
    a display element;
    a projection system;
    a mirror element; and
a diffusing plate having focusing elements on a side facing the projection system a light-blocking mask on a side facing away from the projection system, wherein the focusing elements are irregularly arranged on the surface of the diffusing plate.

11. The head-up display as claimed in claim 10, wherein the focusing elements have irregular shapes.

12. The head-up display as claimed in claim 10, wherein the focusing elements have a common structure size.

13. The head-up display as claimed in claim 10, wherein the focusing elements have at least one from a round shape, an elongate shape and an irregular shape.

14. A method for producing a head-up display, comprising:
- producing a focusing element on a first side of a diffusing plate;
- applying a coating on the second side of the diffusing plate that lies opposite the first side;
- exposing the first side to a beam having defined geometric properties with a wavelength, an intensity and a duration suitable for producing openings in the coating;
- applying an adhesive onto the second side of the diffusing plate;
- applying a microlens arrangement on the second side that is provided with the adhesive;
- aligning the microlens arrangement relative to the focusing elements;
- curing the adhesive; and
- combining the diffusing plate with a projection system that is able to produce a beam having the stated defined geometric properties and with a display element.

* * * * *